Jan. 6, 1970
ISAO TAMAKI
3,488,571
SPEED CONTROL APPARATUS UTILIZING VOLTAGE AND
FREQUENCY SIGNAL
Filed Jan. 21, 1969
FIG. 1.
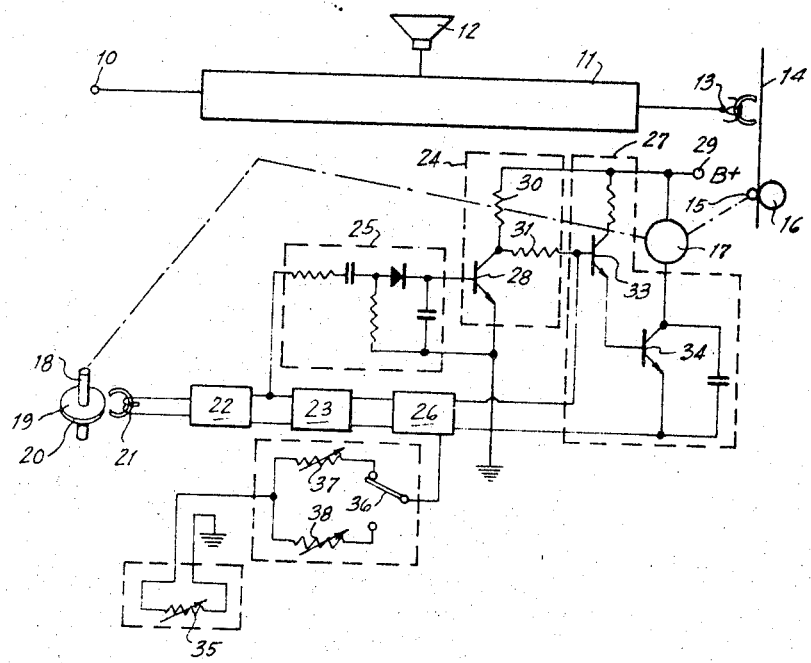
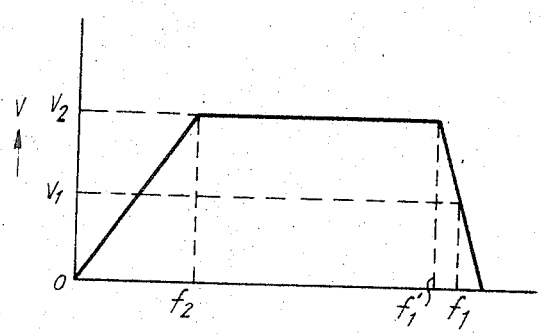
FIG. 2.
INVENTOR.
ISAO TAMAKI
BY
ATTORNEY.

United States Patent Office 3,488,571
Patented Jan. 6, 1970

3,488,571
SPEED CONTROL APPARATUS UTILIZING
VOLTAGE AND FREQUENCY SIGNALS
Isao Tamaki, Tokyo, Japan, assignor to Sony Corporation, Tokyo, Japan, a corporation of Japan
Continuation-in-part of application Ser. No. 586,711, Oct. 14, 1966. This application Jan. 21, 1969, Ser. No. 792,715
Int. Cl. H02k 27/20
U.S. Cl. 318—318                5 Claims

ABSTRACT OF THE DISCLOSURE

An electric motor has its speed controlled in accordance with the magnitude of a control voltage applied to an input of a drive circuit which is connected with the motor and a source of driving voltage, a generator driven by the motor produces signals at a frequency proportional to the motor speed and at a magnitude which increases with motor speed at least up to a first speed, a transistor acting as a switch is actuable by a voltage corresponding to the magnitude of the generated signals to apply a starting voltage to the drive circuit input until the motor comes up to such first speed and to remove the starting voltage at motor speeds exceeding the first speed, a low-pass filter progressively cuts-off the generated signals at frequencies corresponding to motor speeds in a range extending from above the first speed to above a second speed at which the motor is to be maintained, and a voltage proportional to the output of the low-pass filter is applied to the input of the drive circuit to take over the regulation of the motor speed after the switching transistor has been actuated to remove the starting voltage from such input.

---

This invention relates generally to speed control apparatus for controlling the speed of a rotary member, and more particularly to apparatus of the type in which a servo system is used to control the speed of a rotary member and in which switching means are provided to enable the rotary means to be self-starting. This application is a continuation-in-part of my copending U.S. application Ser. No. 586,711, now abandoned, filed Oct. 14, 1966.

There are many applications today where it is desired to control the speed of a rotary member within very close tolerances. One such example is in audio and viedo tape recorders where it is desired to control the speed of the capstan motor or head drum motor within certain defined limits. One of the reasons for this is that it is desired that the tape travel at the same speed, and in the same location, both during recording and reproducing, and at constant speed during normal operation regardless of variations such as fluctuations in load or in the power source.

One of the methods taught by the prior art for controlling the speed of a rotary member, such as a capstan drive motor, is to provide the motor with a servo control system. In such a system the speed of rotation of the motor is sensed in some manner and this signal is then compared with a standard in order to develop an error signal which is used to correct the speed of rotation of the motor. One of the disadvantages of such prior art systems, however, is that the motor is not self-starting, i.e., the motor will not start when there is no error signal.

Another disadvantage with such prior art systems is that once the speed of rotation of the drive motor is regulated during manufacture there is no provision for thereafter adjusting the speed of rotation of the motor. This is a disadvantage where the motor, for example, is incorporated as part of a tape recorder and it is desired to synchronize the speed of the tape with, for example, the speed of movie film.

In view of the foregoing, it is the primary object of the present invention to provide a speed control apparatus for controlling the speed of rotation of a rotary member, and in which the speed control apparatus includes means for permitting the rotary member to be self-starting.

A further object of the present invention is to provide a servo system for controlling the speed of a rotary member and in which a switch is provided to provide energy to the rotary member in order to permit the rotary member to be self-starting.

Another object of the present invention is to provide a servo control system for controlling the speed of rotation of a rotary member in which the servo control system is provided with a low pass filter in order to control the speed of rotation of the motor within close tolerances.

Yet another object of the present invention is to provide a speed control apparatus for controlling the speed of rotation of a rotary member and in which auxiliary apparatus is provided for finite adjustment of the speed of rotation of the rotary member independent of the servo control system.

These and further objects, features and advantages of the present invention will appear from the following detailed description of a preferred embodiment of the invention which is to be read in conjunction with the accompanying drawings in which like components are designated by the same numeral.

In the drawings:

FIG. 1 is a block diagram of the apparatus of the present invention; and

FIG. 2 is a graph illustrating one of the features of the present invention.

The invention will be described with reference to an audio tape recorder but it is to be understood that the invention is applicable to any system in which it is desired to control the speed of rotation of a rotary member. Referring now to the drawings, and particularly to FIG. 1, there is illustrated a diagram partially in block from of an audiotape recorder incorporating the present invention. The input to the tape recorder is designated by the numeral 10 and the numeral 11 designates in general the electronics for recording and reproducing the signal impressed on the input 10. The numeral 12 designates a speaker or other output, and the numeral 13 designates the recording and reproducing head. During operation of the tape recorder the tape 14 is drawn past the head 13 by the capstan 15 and pinch roller 16, which are driven by the motor 17. The motor 17 is preferably a DC motor, the speed of which is controllable by the voltage supplied to the motor. It is desired to control the speed of the motor 17 within very close tolerances so that the tape 14 is drawn past the head 13 at the same speed during both recording and reproducing and at constant speed during normal operation regardless of variations such as fluctuations in load or in the power source.

In order to control the speed of rotation of the motor 17 it is necessary to provide some means for sensing the speed of rotation of the motor 17. In the form illustrated the shaft 18 of the motor 17 has formed integrally therewith, or interconnected thereto, a disc 19 such that the disc 19 rotates at a rate proporional to the speed of rotation of the motor 17. The periphery of the disc 19 is provided with permanent magnets 20 with each adjacent magnet 20 being of a different polarity. As the disc 19 rotates the magnets 20 induce a signal in the pickup head 21, the frequency of this signal being proportional to the speed of rotation of the disc 19.

The signal from the head 21 is amplified by the amplifier 22. The amplified signal is then fed to the low pass filter 23 and to the switching apparatus designated in general by the numeral 24. The signal from the amplifier 22 is first rectified by the rectifier designated in general by the numeral 25 before it is fed into the switch 24. The signal from the low pass filter 23 is detected by the detector 26 and the rectified output from the detector 26 is then fed to the circuit for driving the motor 17, the motor driving circuit being designated in general by the numeral 27.

In FIG. 2 there is illustrated, as an example, the characteristics desired of the system of the present invention. This figure illustrates the variations of the voltage at the output of the detector 26 as a function of motor speed. The abscissa designates the speed of rotation of the motor 17 while the ordinate represents the voltage at the output of detector 26 as determined by the characteristics of head 21 up to the speed $f_2$ and thereafter as determined by the characteristics of low pass filter 23. In the system illustrated, it is assumed that it is desired to control the speed of rotation of the motor 17 so as to maintain the speed $f_1$, which in turn corresponds to a voltage $V_1$. For a purpose to be presently described the transistor 28 is set to conduct when the voltage applied to its base through rectifier 25 is at least the voltage corresponding to a motor speed $f_2$ which is less than the speed $f_1$. Since the voltage supplied through rectifier 25 to transistor 28 is not influenced by low pass filter 23, it will be apparent that such voltage continues to cause conductance of transistor 28 at speeds above $f_2$.

The low pass filter 23 is pre-set to pass all frequencies below the frequency corresponding to the motor speed $f_1'$ which is the lower limit of the range within which it is desired to control the speed of rotation of the motor 17. As the speed of motor 17 increases beyond $f_1'$, the filter 23 progressively cuts off the signal from the pickup head 21 so that the output voltage of selector 26 decreases from $V_2$ at motor speed $f_1'$ to $V_1$ at motor speed $f_1$ and then below $V_1$ at motor speeds in excess of the speed $f_1$ at which the speed is to be regulated.

In operation, when the system illustrated in FIG. 1 is activated to start the motor 17, a B+ voltage is applied to the terminal 29. At this instant the motor 17 is not rotating and, accordingly, no signal is induced in the pickup head 21. There is accordingly no signal being applied to the base of transistor 28 in the switching circuit 24 and the transistor 28 is cut off. The B+ voltage from the terminal 29 accordingly is applied to the base of transistor 33 in the motor drive circuit 27 through the circuit consisting of the resistors 30 and 31. Therefore, upon starting the B+ voltage is applied directly to the motor 17 and current is conducted through the motor 17 and transistor 34 to ground. In this manner the motor 17 is self-starting.

As the speed of rotation of the motor 17 increases up to the value $f_2$, the voltage of the signal induced in the pickup head 21 and supplied through rectifier 25 to the base of transistor 28 increases from 0 to the value at which transistor 28 conducts. When the transistor 28 starts to conduct, the circuit from the terminal 29 through the resistor 30 and the transistor 28 to ground is completed. In this manner the transistor 28 functions as a switch to disconnect the power source terminal 29 from the base of transistor 33 when the motor speed reaches the value $f_2$. When the motor speed attains the value $f_2$, the voltage applied to the base of transistor 33 from detector 26 is at the value $V_2$ (FIG. 2) which is greater than $V_1$ so that the motor speed continues to increase. When the motor speed reaches $f_1'$, the voltage from detector 26 to the base of transistor 33 begins to decline with further increasing motor speed until the motor speed stabilizes at the desired speed $f_1$ corresponding to voltage $V_1$ at the output of detector 26. If the motor speed falls below $f_1$ toward $f_1'$, the voltage supplied to the base of transistor 33 increases from $V_1$ towards $V_2$ to correspondingly increase the motor speed back to $f_1$. If the motor speed increases above $f_1$, the voltage at the output of detector 26 is decreased and, as applied to the base of transistor 33, causes transistors 33 and 34 to correspondingly decrease the motor speed back to $f_1$. Therefore, the motor speed is maintained close to the value $f_1$.

When the system is shut off by removing the voltage B+ from terminal 29, the transistor 28 is again cut off. The transistor 28 accordingly functions as a switch which is open when the system is first started and remains open until a pre-set voltage is induced in the pickup head 21. When this value is reached the switch constituted by transistor 28 closes thereby permitting a servo control system to control the speed of rotation of the motor 17 within close tolerances about the value $f_1$.

The variable factors in the system just described, such as the low pass filter 23, the switch 24, the drive circuit 26, etc., are generally pre-set during manufacture in order to have the motor 17 rotate at a velocity within specified tolerances. During operation of the apparatus, however, it often is desired to vary the speed of rotation of the motor 17 within finite limits. An instance of this, for example, is where an audio tape recorder having a motor 17 is being used in conjunction with a movie projector and it is desired to synchronize the speed of the film with the speed of the tape 14. It is, of course, desired that this finite variation in the speed of rotation of the motor 17 have no effect on the servo control system or on the switch 24. This is accomplished in the present invention by providing means for controlling the relationship of the output voltage from the detector 26 to the motor speed. By varying this relationship the speed of rotation of the motor 17 which is to be maintained can be varied within finite limits.

The method for accomplishing this is to place a variable resistor 35 in the circuit of the detector 26. Since a tape recorder is generally operated at two speeds, i.e., 7½ and 3¾ inches per second a switch 36 is also provided. It is to be understood that if the circuit is provided with a switch 36 that means must also be provided for varying the characteristics of the low pass filter 23 for each speed selected. The switch 36 either introduces a resistor 37 or 38 into the circuit of the detector 26. The values of the resistors 37 and 38 are preferably pre-set during manufacture.

The variable resistor 35 is provided with an exterior control from the tape recorder so that it can be adjusted during operation. The varying of the resistor 35 varies the voltage of the output transmitted from detector 26 to the base of transistor 33 in the drive circuit 27 and accordingly varies the speed of the motor 17 without affecting the servo system or the switch 24.

What has been described is a speed control apparatus which provides a novel servo control system for controlling the speed of rotation of a rotary member within close tolerances. This is accomplished by providing a low pass filter in the servo control system which is pre-set to a desired value in order to control the speed of rotation of the rotary member during operation. A switch is also provided in order to render the motor self-starting. This switch applies a source voltage to drive circuit 27 only when the system is being started and once the rotary member achieves a certain predetermined speed the switch, in essence, disconnects the source voltage from the motor drive circuit and such source voltage is replaced by a voltage from the servo control system. In order to provide the rotary member with a finite speed control independent of the servo system a means is also provided for varying the voltage from the output of the servo control systems. This permits finite adjustment of the speed of rotation of the rotary member without effecting the servo control loop or the switching mechanism.

It is to be understood that although a preferred embodiment has been illustrated and described that changes

What is claimed is:

1. Apparatus for controlling the speed of rotation of an electric motor comprising a source of voltage for driving said motor, drive circuit means connected with said source and said motor to control the rotational speed of the motor in accordance with the magnitude of a control voltage applied to an input of said drive circuit means, generating means driven by said motor to generate signals at a frequency which corresponds to the motor speed and at a voltage which increases with increasing motor speed at least up to a first predetermined speed, switching means actuable by the voltage of said signals from the generating means to apply a starting voltage as said control voltage to said input of the drive circuit means so long as the motor speed is below said first predetermined speed and to remove said starting voltage from said input at motor speeds exceeding said first speed, low pass filter means connected with said generating means and being operative to progressively cut-off said signals from the generating means when said signals have frequencies corresponding to motor speeds in a range that has a lower limit greater than said first speed and that extends below and above a second predetermined speed at which the motor is to be maintained, and detector means receiving the output of said filter means and applying a corresponding output voltage as said control voltage to said input of the drive circuit means for regulating the motor speed at said second speed after said switching means has been actuated to remove said starting voltage from said input in response to the attainment of said first speed.

2. Apparatus according to claim 1, in which said switching means includes a transistor to the base of which there is applied said voltage of the signals from said generating means so that said transistor is conducting only when said voltage applied to its base corresponds to a motor speed of at least said first speed, connecting means to apply said starting voltage to said input, and means to short said connecting means to ground by way of said transistor whenever the latter is conducting.

3. Apparatus according to claim 2, in which said connecting means extends from said source of the voltage for driving said motor.

4. Apparatus according to claim 1, further comprising means to adjustably vary the relation of said output voltage from said detector means to the motor speed whereby to vary the value of said second speed at which the motor speed is to be regulated.

5. Apparatus according to claim 4, in which said means to adjustably vary the relation of said output voltage to motor speed includes variable resistance means interposed in circuit with said detector means.

References Cited

UNITED STATES PATENTS

| 2,448,793 | 9/1948 | Glass | 318—327 |
| 2,443,048 | 6/1948 | McComb | 318—327 |
| 2,762,005 | 9/1956 | Harvey et al. | 318—345 |
| 2,847,632 | 8/1958 | Harvey et al. | 318—345 |
| 3,233,163 | 2/1966 | Mishima | 318—327 |
| 3,309,597 | 3/1967 | Gabor et al. | 318—393 |
| 3,436,637 | 4/1969 | Ehret | 318—318 |

ORIS L. RADER, Primary Examiner

LESTER L. HEWITT, Assistant Examiner.

U.S. Cl. X.R.

318—327, 345